B. B. NEUTEBOOM.
UNIVERSAL JOINT CASING.
APPLICATION FILED JUNE 3, 1918. RENEWED MAY 25, 1922.

1,428,799.

Patented Sept. 12, 1922.

3 SHEETS—SHEET 1.

Inventor
Boudewijn B. Neuteboom.
By Hull, Smith, Brock & West.
Attys.

B. B. NEUTEBOOM.
UNIVERSAL JOINT CASING.
APPLICATION FILED JUNE 3, 1918. RENEWED MAY 25, 1922.

1,428,799.

Patented Sept. 12, 1922.
3 SHEETS—SHEET 2.

Inventor
Boudewijn B. Neuteboom.
By Hull, Smith, Brock & West
Attys.

B. B. NEUTEBOOM.
UNIVERSAL JOINT CASING.
APPLICATION FILED JUNE 3, 1918. RENEWED MAY 25, 1922.

1,428,799.

Patented Sept. 12, 1922.

3 SHEETS—SHEET 3.

Inventor
Boudewijn B. Neuteboom.
By Hull, Smith, Brock & West
Attys.

Patented Sept. 12, 1922.

1,428,799

UNITED STATES PATENT OFFICE.

BOUDEWIJN B. NEUTEBOOM, OF DETROIT, MICHIGAN, ASSIGNOR, BY MESNE ASSIGNMENTS, TO WINTHER MOTORS, INC., OF KENOSHA, WISCONSIN, A CORPORATION OF DELAWARE.

UNIVERSAL-JOINT CASING.

Application filed June 3, 1918, Serial No. 237,962. Renewed May 25, 1922. Serial No. 563,677.

*To all whom it may concern:*

Be it known that I, BOUDEWIJN B. NEUTEBOOM, a subject of the Queen of the Netherlands, residing at Detroit, in the county of Wayne and State of Michigan, have invented a certain new and useful Improvement in Universal-Joint Casings, of which the following is a full, clear, and exact description, reference being had to the accompanying drawings.

This invention relates to an improved universal joint casing composed of parts cooperating to effectually enclose the joint against the admission of dust or dirt, and the egress of oil or other lubricant, the parts being held against rotation while being free to move with respect to each other according to the angular movements between the longitudinal axes of the elements connected by the joint. Thus the durability of my improved casing is greatly increased over that of prevailing universal joint casings wherein the parts both rotate and swing, and the life of the packing means which closes the joints between the casing parts is materially prolonged.

My invention further comprehends a comparatively simple and economical yet highly efficient construction through which the foregoing results are attained.

Figure 1:
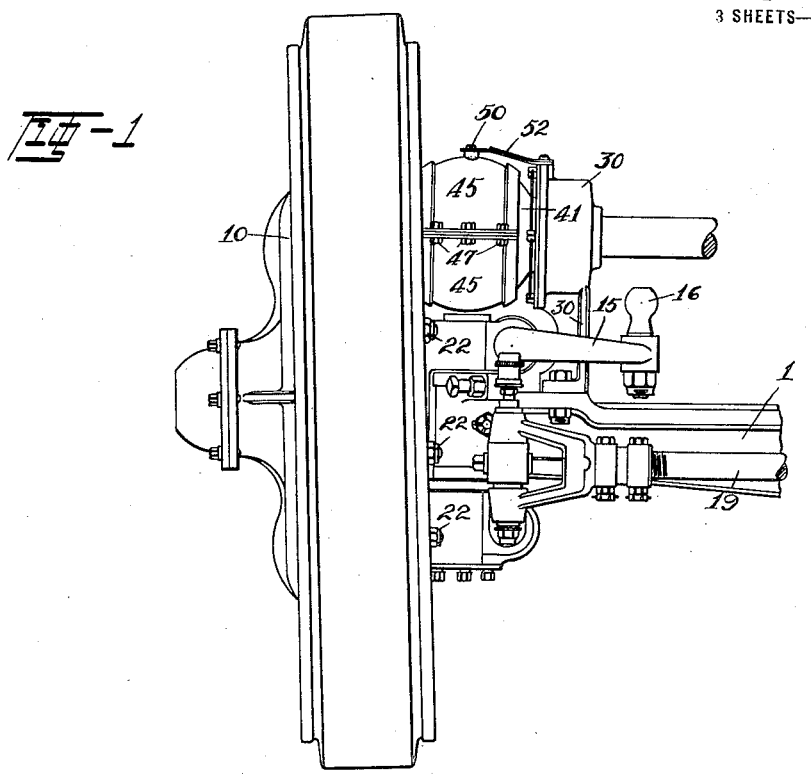
Figure 2:
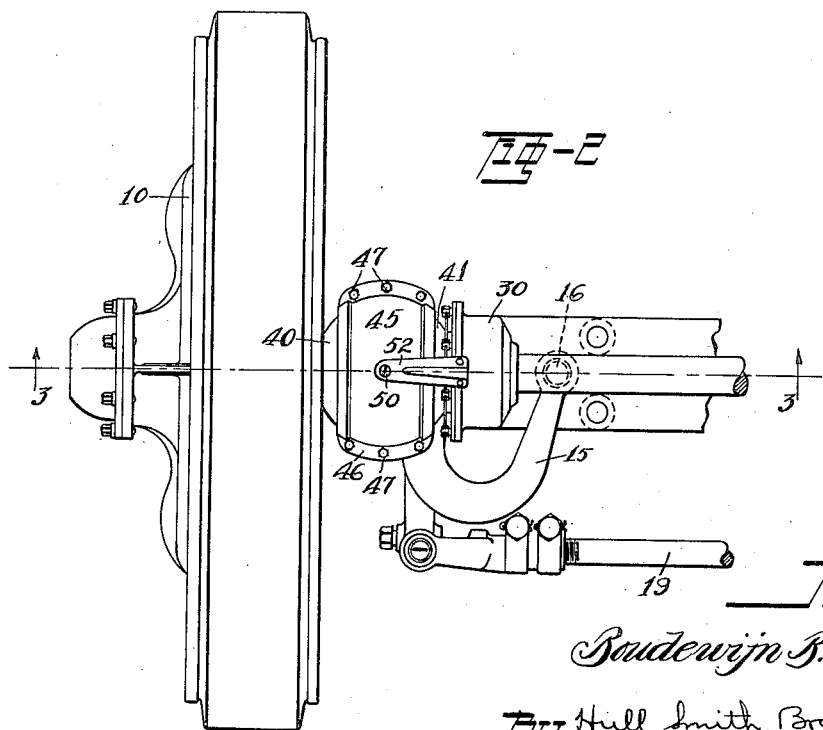
Figure 3:
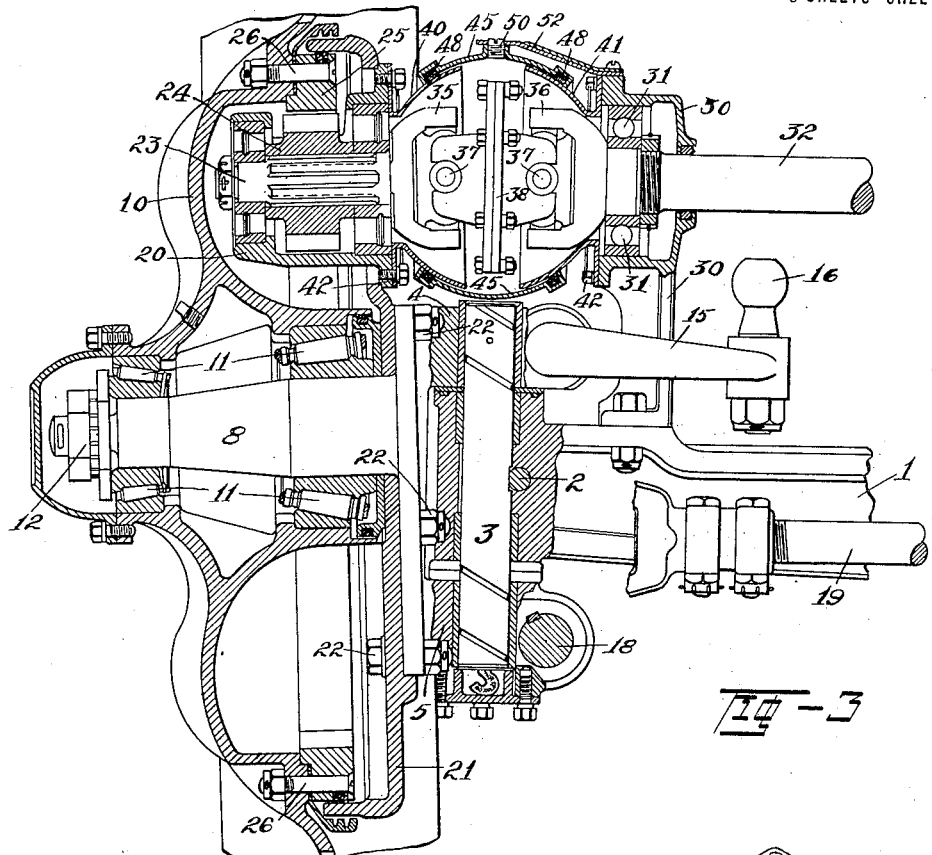
Figure 4:
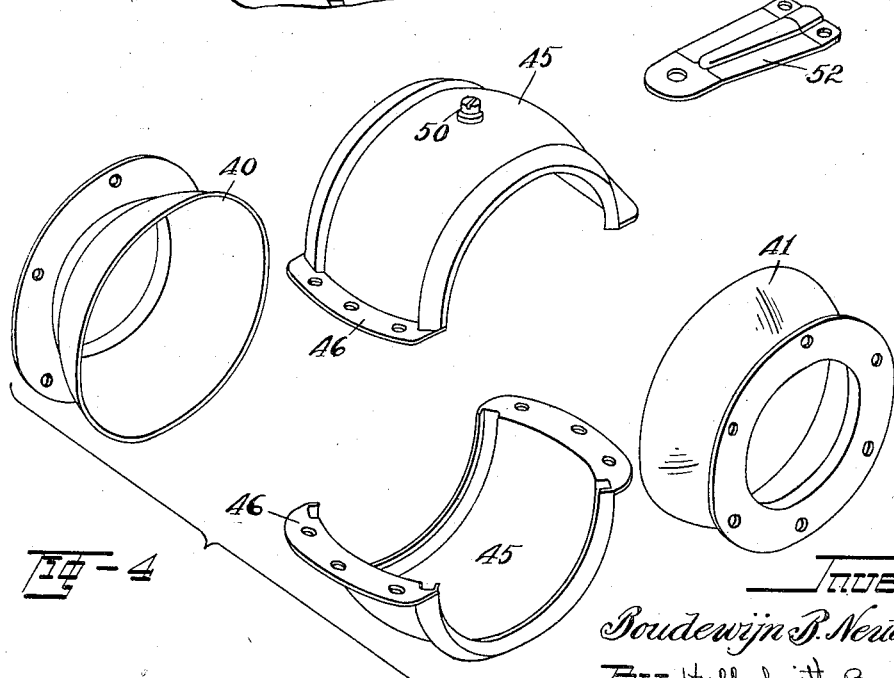
Figure 5:
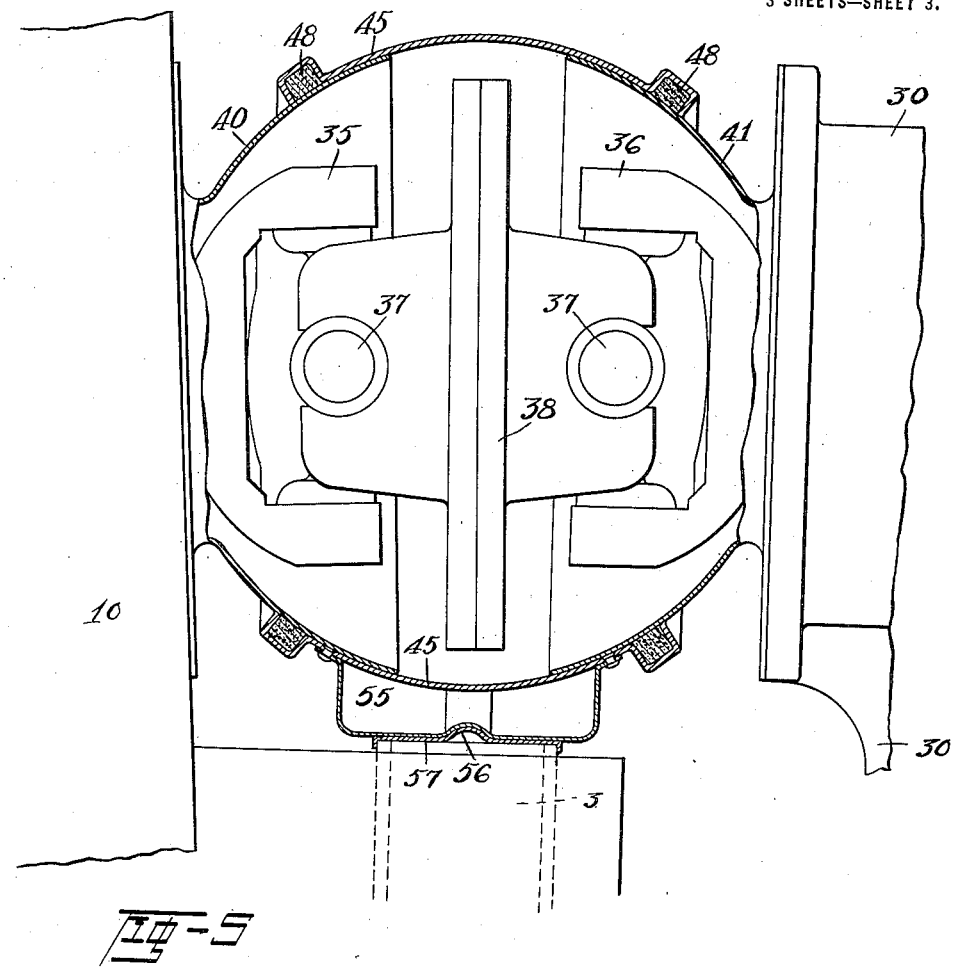
Figure 6:
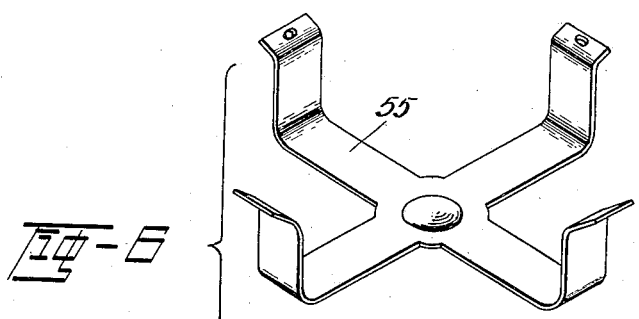

A situation in which my improved casing may be employed with marked advantage is in the driving connections between a combined driving and steering wheel of a motor vehicle and the propelling shaft thereof, for here the conditions under which a universal joint is required to operate are very severe and the angular movements between the shaft sections connected by the universal joints are quite constant. I have shown my invention in this environment in the accompanying drawings wherein Fig. 1 is an elevation of my improved universal joint casing shown as incorporated in the driving connections of a combined driving and steering wheel of a motor vehicle; Fig. 2 is a plan view of the parts shown in Fig. 1; Fig. 3 is an enlarged sectional view on the line 3—3 of Fig. 2; Fig. 4 is a perspective view of the casing parts in separated condition; Fig. 5 is a section detail of the joint casing and includes means for retaining the intermediate shell against rotation that differs from that exhibited in the foregoing figures; and Fig. 6 is a perspective view of such means.

In the present installation, 1 is the axle of a motor driven vehicle within the end of which is secured in a vertical position, as by a key bolt 2, a knuckle pin 3. Journaled upon the upper and lower ends of the knuckle pin are the bearing portions 4 and 5, respectively, of a steering knuckle which carries the hub spindle 8. A wheel 10 is mounted through bearings 11, for rotation upon the spindle 8, and is held against withdrawal therefrom by the nut 12, applied to the outer end of the spindle, all of which is in accordance with established practice.

An arm 15 is connected with the upper bearing member 4 of the steering knuckle 6 and is adapted for connection, through the ball 16, with the steering apparatus of the vehicle; and an arm 18, having connection with the lower bearing member 5 of the steering knuckle is connected with a corresponding arm of the steering knuckle occurring on the opposite side of the vehicle through the connecting rod or reach 19.

Within a casing 20 that is rigidly supported from the steering knuckle through a disk 21—the latter being connected to the steering knuckle by bolts 22—is a short shaft section 23 to which is secured a pinion 24 that meshes with an internal gear 25 attached, as by bolts 26, to the wheel 10.

30 is a bracket which rises from the axle 1 just inside the knuckle pin 3, and within its upper end is journaled, through the antifriction bearing 31, the outer end of a drive shaft 32, the shaft 32 and the short shaft 23 being substantially in alignment when the parts are in normal condition.

The adjacent ends of the shafts 23 and 32 carry, respectively, forked members 35 and 36 which have connection, through power transmitting elements 37, with a central element 38, the connections between the element 38 and the respective forked members being in the nature of the usual universal joint, the assembly constituting, in effect, a double universal joint that is enclosed by my improved casing.

The casing is spherical and comprises shells 40 and 41 that are connected, respectively, to the casing 20 within which is supported the short shaft 23, and with the head of the bracket 30, the shells being shown as connected to these parts by screws 42. The adjacent ends of the shells are spaced apart sufficiently to obviate interference when the parts which carry them are swung at an angle to each other; and the gap between the shells is closed by an intermediate shell 45 which is shown as fitting over and about the adjacent ends of the former shells, the shell 45 being formed of halves which are shown as meeting on a horizontal plane, the engaging edges of the halves being flanged, as shown at 46, and connected by bolts 47. The edges of the intermediate shell 45 are formed to constitute inwardly opening channels within which are fitted rings 48 of packing material suitable to effectually close the joint between the shells or casing members against the ingress of dust or dirt and the egress of a lubricant.

The upper end of the intermediate shell 45 is shown as having an opening through which a lubricant may be introduced into the casing, and which is adapted to be closed by a plug 50. A spring finger 52 is shown as having a part for cooperation with the plug 50, and the finger is secured to a non-rotating part of the structure, in the present instance to the bracket 30, the finger serving to hold the intermediate shell of the joint casing against rotation.

In the assembly shown in Fig. 5 I substitute, for the spring finger 52, a resilient element 55 that is riveted to the bottom of the intermediate shell 45 and has a depression in its central body portion which receives a projection 56 of a member 57 shown as carried by the protruding end of a bushing surrounding the upper end of the knuckle pin 3.

This resilient element not only prevents rotation of the intermediate shell, but tends to elevate it and thus compresses the packing between the lower portions of the shells, thereby increasing the effectiveness of the oil-tight joint between the casing sections in the region where it is most essential.

I have described herein in detail a very satisfactory and desirable embodiment of my invention although it will be understood that I do not limit myself to the present construction further than is required by the terms of the following claims.

Having thus described my invention, what I claim is:—

1. In combination with a pair of elements connected by a universal joint, and a structure having parts wherein the respective elements are journaled, the parts being capable of relative movement according to the angular movement between the elements, of a spherical casing enclosing the universal joint and comprising opposed shells that are spaced apart and are secured against rotation to the aforesaid parts of the structure, an intermediate shell embracing the adjacent ends of the former shells and closing the gap therebetween, the intermediate shell having an aperture, means closing said aperture, and a spring finger carried by the structure for cooperation with said means to hold the intermediate shell against rotation.

2. In combination with a pair of elements connected by a universal joint, and a structure having parts wherein the respective elements are journaled, the parts being capable of relative movement according to the angular movement between the elements, of a spherical casing enclosing the universal joint and comprising opposed shells that are spaced apart and secured against rotation to the aforesaid parts of the structure, an intermediate shell embracing the adjacent ends of the former shells and closing the gap therebetween, and a resilient member interposed between the structure and the intermediate shell for holding the latter against rotation.

3. In combination with a pair of elements connected by a universal joint, and a structure having parts wherein the respective elements are journaled, the parts being capable of relative movement according to the angular movements between the elements, of a spherical casing enclosing the universal joint and comprising opposed shells that are spaced apart and secured against rotation to the aforesaid parts of the structure, an intermediate shell embracing the adjacent ends of the former shells and closing the gap therebetween, and a resilient member interposed between opposed portions of the structure and the intermediate shell for holding the latter against rotation and in firm contact with adjacent portions of the former shells.

In testimony whereof, I hereunto affix my signature.

BOUDEWIJN B. NEUTEBOOM.